United States Patent
Antczak et al.

(10) Patent No.: US 6,235,669 B1
(45) Date of Patent: *May 22, 2001

(54) VISCOSITY TAILORING OF FUSED SILICA

(75) Inventors: Stanley M. Antczak, Chesterland; Mohan Rajaram, Mentor, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,177

(22) Filed: Nov. 19, 1999

Related U.S. Application Data

(63) Continuation of application No. 08/381,374, filed on Jan. 31, 1995, which is a continuation-in-part of application No. 08/069,626, filed on Jun. 1, 1993, now abandoned.

(51) Int. Cl.[7] ................................................. C04B 35/14
(52) U.S. Cl. ............................... 501/133; 385/66; 313/2.1
(58) Field of Search .............................. 501/133; 313/2.1; 385/66, 68

(56) References Cited

U.S. PATENT DOCUMENTS

| | | |
|---|---|---|
| 3,764,286 | 10/1973 | Antczak et al. . |
| 3,806,570 | 4/1974 | Flamenbaum et al. . |
| 4,028,124 | 6/1977 | Bihuniak et al. . |
| 4,047,966 | 9/1977 | Bihuniak et al. . |
| 4,180,409 | 12/1979 | Mansmann . |
| 5,096,857 | 3/1992 | Hu et al. . |

FOREIGN PATENT DOCUMENTS

| | | |
|---|---|---|
| 890330611 | 8/1991 | (JP) . |
| 69142456 | 1/1996 | (JP) . |

OTHER PUBLICATIONS

Manufacture of heat–resistant quartz glass. Chemical Abstracts, vol. 116, Ref. No. 240607k, Feb. 17, 1992.

*Primary Examiner*—Paul Marcantoni
(74) *Attorney, Agent, or Firm*—Fay, Sharpe, Fagan, Minnich & McKee, LLP

(57) ABSTRACT

A synthetic fused silica composition comprising silica and aluminum, wherein said aluminum is generally present in at least 7 parts per million and the composition has a viscosity of at least $10^{14.5}$ poise.

8 Claims, 3 Drawing Sheets

VISCOSITY TAILORING OF FUSED SILICA

This application is a con of Ser. No. 08/381,574 filed Jan. 31, 1995, which is a continuation-in-part of U.S. Ser. No. 08/069,626 filed Jun. 1, 1993 now abn.

BACKGROUND OF THE INVENTION

This invention relates to synthetic fused silica for use in semiconductor applications. Particularly, this invention relates to synthetic fused silica for preparation of elongated fused quartz members. More particularly, this invention relates to synthetic silica for use in tubing and rods for semiconductors. Furthermore, this invention relates to synthetic fused silica having a viscosity of between $10^{14.5}$ to $10^{15}$ at 1,100° C. for use in a variety of embodiments.

Throughout the specification, numerous references will be made to the use of fused silica in semiconductor applications; however, it should be realized that the invention could be applied to many industries requiring synthetic fused silica having a higher than normal viscosity.

Fused silica has been used in metal-halide, halogen and mercury lamps because of its excellent mechanical strengths and its ability to handle high operating temperatures. In addition, fused silica is becoming an important constituent of the ever-expanding semiconductor and fiber optics industries. Its high purity and resistance to high temperatures are particularly desirable characteristics.

One difficulty in the use of fused quartz in the semiconductor industry is the level of impurities (30–50 ppm). Accordingly, synthetic silica has been experimented with as a replacement to natural silica for some applications. However, a difficulty often encountered in utilizing the synthetic material is its low viscosity. Although a low viscosity may benefit fabricators who rework fused silica products, many fabricators require a fused silica having a higher viscosity. The semiconductor industry is an example of an industry which requires a high viscosity, low impurity fused silica.

SUMMARY OF THE INVENTION

Accordingly, it is a primary object of this invention to provide a new and improved synthetic fused silica.

It is a further object of this invention to provide a new and improved synthetic fused silica having a viscosity above $10^{14.5}$ poise at 1,100° C.

A still further object of this invention is to provide a new and improved process for preparing a synthetic fused silica having a tailored viscosity.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

To achieve the foregoing objects in accordance with the purpose of the invention, as embodied and broadly described herein, the synthetic fused silica of this invention comprises a mixture of synthetic silica and aluminum and has a viscosity of at least $10^{14.5}$ poise at 1,100° C. Preferably, the fused synthetic silica comprises a mixture of silica and at least 7 parts per million aluminum.

The synthetic fused silica mixture is formed by combining synthetic silica and alumina. Typical synthetic silica includes trace amounts of impurities such as alkali metals and hydroxyl groups. In a further preferred embodiment, the mixture comprises a ratio defined as $R=Al_2O_3/(Li_2O+Na_2O+K_2O+H_2O)$ wherein R is greater than or equal to 0.5 and R is less than or equal to 4.0. More preferably, R is greater than or equal to 1 and less than or equal to 1.25.

BRIEF DESCRIPTION OF THE DRAWINGS

The invention consists of the novel parts, construction, arrangements, combinations and improvements shown and described. The accompanying drawings, which are incorporated in and constitute a part of the specification, illustrate one embodiment of the invention and together with the description serve to explain the principles of the invention.

Of the Drawings.

DETAILED DESCRIPTION OF THE INVENTION

Reference will now be made in detail to the present preferred embodiment of the invention.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention defined by the appended claims.

Viscosity as a function of $R=Al_2O_3/M_2O$, wherein M=Li, K and Na, has been found to have no relationship between the viscosity and the ratio (R) in fused synthetic silica. However, the current inventors have found that the log of viscosity is well represented by the function of $R=Al_2O_3/(M_2O+H_2O)$.

Figure 1:
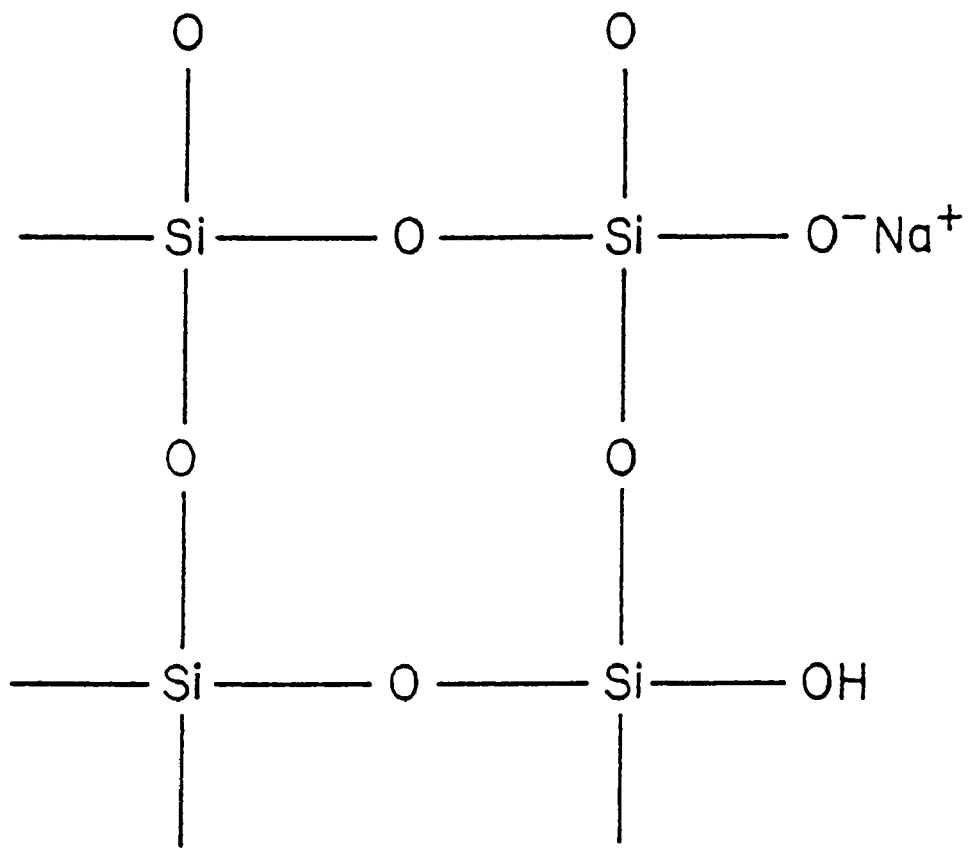
FIG. 1 is a representation of a prior art fused silica lattice structure.
Figure 2:
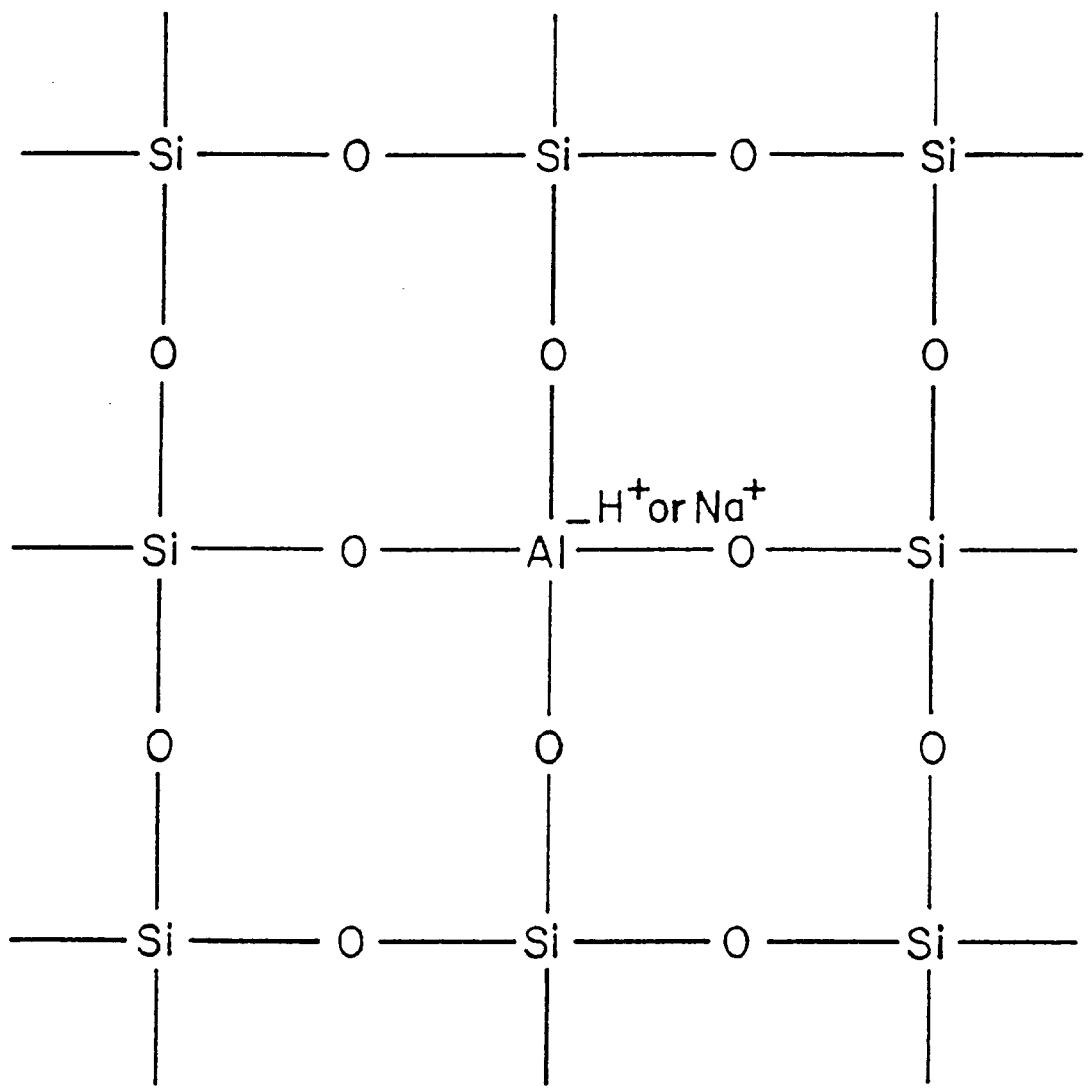
FIG. 2 is a representation of a lattice structure of the current invention.

Particularly, without being bound by theory, it is believed that both alkali and hydroxyl groups present as impurities in all synthetic silica compositions function to terminate the composition network by forming non-bridging oxygens as shown in FIG. 1. This indicates that the hydroxyl group is a substantial contributor to the R ratio. Concurrently, the inventors have determined that the addition of calculated amounts of aluminum, generally in the form of alumina, during the preparation of synthetic fused silica can create an aluminum site in the lattice structure functioning to tie up terminal alkali and hydroxyl groups, allowing the bridging of silica and oxygen to continue. FIG. 2 represents the function of aluminum as envisioned by the inventors. The additional binding of silicon, alkali, and oxygen molecules results in a higher viscosity fused silica. Accordingly, the synthetic silica starting material preferably has a low level of alkali and silicon impurity as demonstrated by the Examples that follow. In fact, a synthetic silica substantially free of silicon is preferred.

A synthetic silica accomplishing the se goals can be obtained from the Mitsubishi Kasei Corp., as MKC synthetic silica. Those of ordinary skill in the art will be aware of additional sources of acceptable synthetic silica.

EXAMPLES

Each of samples 1–7 were pre pared from Mitsubishi MKC synthetic silica. Samples 1 and 2 demonstrate the composition of the silica. Examples 3–7 demonstrate fused synthetic silica following addition of various parts per million of alumina. The alumina was obtained from Reynolds Aluminum, particularly RC-HPT-DBM. The alumina was well mixed with the silica and thereafter calcined at about 1050° C. to remove residual organics. The resultant powder was analyzed and the results are shown in Table 1.

Preferably, the powder obtained is thereafter formed into a clear article as described in U.S. Pat. Nos. 3,261,676 and 3,764,286, herein incorporated by reference. The term "clear" as utilized herein means that the fused glass composition is substantially free of trapped gas bubbles.

COMPARATIVE EXAMPLES

Sample 8 (comparative) was comprised of synthetic silica doped with 500 ppm silicon and 100 ppm aluminum. To prepare Sample 8, 495.85 grams of synthetic silica obtained from Mitsubishi Chemical Corporation were mixed with 2.50 grams of silicon (99.99% purity) obtained from Ethle corporation, 0.95 grams of $Al_2O_3$ (reagent grade) obtained from Baker Chemicals and 0.70 grams of cab-o-sil obtained from Cabot Corp. in a Turbula mixer for 20 minutes to form a blend.

Sample 9 was comprised of synthetic silica doped with 9 ppm aluminum. To prepare Sample 9, 0.85 grams of 1%

TABLE 1

Samples 1–7

| | 1 | 2 | 3 | 4 | 5 | 6 | 7 |
|---|---|---|---|---|---|---|---|
| Chemical (ppm) | | | | | | | |
| Al | 0.3 | 0.2 | 3.0 | 2.7 | 7.3 | 13.7 | 29.9 |
| Ba | <.05 | <.05 | <.05 | <.05 | <.05 | <.05 | <.05 |
| Ca | <.05 | <.05 | <.1 | <.05 | <.05 | <.05 | <.05 |
| Cd | <.02 | <.02 | <.02 | <.02 | <.02 | <.02 | <.02 |
| Co | <.02 | <.02 | <.02 | <.02 | <.02 | <.02 | <.02 |
| Cu | <.03 | <.03 | <.03 | <.03 | <.03 | <.03 | <.03 |
| Fe | 0.1 | 0.08 | 0.1 | 0.09 | 0.07 | 0.07 | 0.08 |
| K | <.05 | <.05 | 0.1 | 0.1 | 0.1 | 0.2 | 0.2 |
| Li | <.05 | <.05 | <.2 | <.05 | <.05 | <.05 | <.05 |
| Mg | <.1 | <.05 | <.1 | <.05 | <.05 | <.05 | <.05 |
| Mn | <.02 | <.02 | <.03 | <.02 | <.02 | <.02 | <.02 |
| Mo | <.02 | <.02 | <.02 | <.02 | <.02 | <.02 | <.02 |
| Na | <.05 | <.05 | <.3 | 0.1 | 0.1 | 0.1 | 0.2 |
| Ni | <.05 | <.05 | <.05 | <.05 | <.05 | <.05 | <.05 |
| P | <.1 | <.1 | <.1 | <.1 | <.1 | <.1 | <.1 |
| Sr | <.03 | <.03 | <.03 | <.03 | <.03 | <.03 | <.03 |
| Ti | <.02 | 0.05 | 0.2 | <.02 | <.02 | 0.1 | 0.04 |
| Zn | <.05 | <.05 | <.05 | <.05 | <.05 | <.05 | <.05 |
| Zr | <.02 | <.02 | 0.2 | <.02 | <.02 | <.02 | 0.04 |
| Log Viscosity | | | | | | | |
| ∂ 1100 C | 13.9 | 14.0 | 14.4 | 14.8 | 15.0 | 14.7 | 14.8 |
| ∂ 1200 C | 12.7 | 12.7 | 13.0 | 13.3 | 13.5 | 13.3 | 13.3 |
| ∂ 1300 C | 11.6 | 11.6 | 11.8 | 12.0 | 12.1 | 12.0 | 12.0 |
| Annealing Point (C) | 1161.0 | 1163.0 | 1187 | 1208.0 | 1218.9 | 1208.9 | 1207.6 |
| Strain Point (C) | 1050.0 | 1052.3 | 1085 | 1109.0 | 1121.6 | 1105.0 | 1106.9 |
| Activation Energy (kcal/mol/K) | 117 | 118 | 133 | 142 | 146 | 135 | 139 |

The annealing point is the temperature at which the internal stress is substantially relieved at 15 minutes. The corresponding viscosity is $10^{13.2}$ poise.

The strain point is the temperature at which the internal stress is substantially relieved at 4 hours. The corresponding viscosity is $10^{14.5}$ poise.

Figure 3:
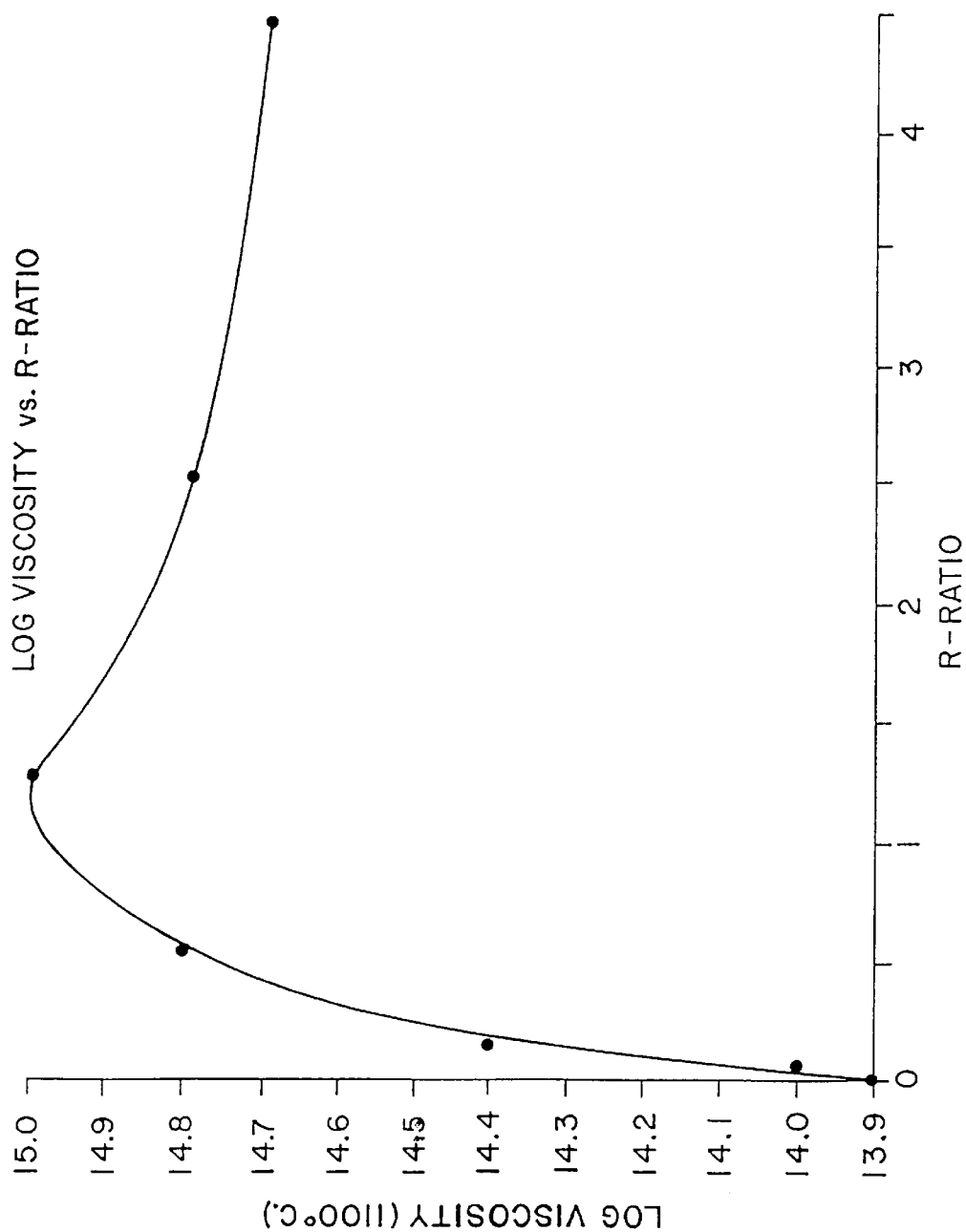
FIG. 3 is a graphic representation of the R ratio of the current invention vs. log viscosity.

Table 1 describes the effect of various aluminum quantities on a synthetic fused silica mixture. FIG. 3 graphically reflects the log viscosity of synthetic fused silica having various aluminum contents at 1100° C. FIG. 3 demonstrates a preferred viscosity for semiconductor applications is achieved by a synthetic fused silica composition having an R ratio of between 0.5 and 4 and preferably between about 1.0 and about 1.25.

As will be apparent to one of ordinary skill in the art, this invention also provides a process for tailoring viscosity to non-semiconductor industries. Accordingly, an understanding of the alkali and hydroxyl levels allows addition of the appropriate alumina content to achieve the desired viscosity.

$Al_2O_3$ in synthetic silica sand obtained from Baker Chemicals and 0.15 grams of cab-o-sil obtained from Cabot Corp. were mixed with 499 grams of synthetic silica obtained from Mitsubishi Chemical Corporation using a Turbula mixer for 20 minutes to form a blend.

Samples 8 and 9 were fused side-by-side in a molybdenum foil boat in a high temperature tungsten furnace at 1800° C. having a hydrogen atmosphere according to the following schedule. The furnace was evacuated to between $10^{-4}$ and $10^{-5}$ torr and back filled with hydrogen. The furnace was taken up to 1800° C. over a 30 minute period and held at that temperature for 60 minutes. Thereafter, the furnace was allowed to cool to room temperature.

The samples were approximately 25 mm×25 mm×20 mm cubes. Visual inspection showed Sample 8 contained at least several hundred trapped gas bubbles. In contrast, Sample 9 contained about twenty or fewer trapped gas bubbles. As is well accepted in the art, the large volume of trapped gas in Sample 8 causes opacity in an elongated body. In fact, tubes formed of the composition of Sample 8 were substantially opaque and unacceptable for a semiconductor application.

Thus, it is apparent that there has been provided, in accordance with the invention, a synthetic fused silica composition that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A tube for manufacture of an optical fiber, said tube comprised of a synthetic silica including aluminum dopant, said synthetic silica having a viscosity of at least about $10^{14.5}$ poise at 1,100° C.

2. The tube of claim 1 wherein said synthetic silica has a viscosity of about $10^{15}$ poise at 1,100° C.

3. The tube of claim 1 wherein said synthetic silica further comprises at least trace amounts of hydroxyl ions.

4. The tube of claim 1 wherein said synthetic silica is substantially free of silicon.

5. The tube of claim 1 wherein said synthetic silica includes at least about 7 parts per million aluminum.

6. The tube of claim 1 wherein said synthetic silica includes at least about 29.9 parts per million aluminum.

7. The tube of claim 1 wherein said synthetic silica further comprises at least trace amounts of elements selected from the group consisting of hydroxyl ions, lithium, sodium, potassium, and said aluminum is present according for the relationship:

$$R=Al_2O_3/(Li_2O+Na_2O+K_2O+H_2O)$$

such that $0.5 \leq R \leq 4.0$.

8. The tube of claim 7 wherein R>1.

* * * * *